US008854755B2

(12) United States Patent
Chang et al.

(10) Patent No.: US 8,854,755 B2
(45) Date of Patent: *Oct. 7, 2014

(54) MULTI-LEVEL RUN-LENGTH LIMITED FINITE STATE MACHINE FOR MAGNETIC RECORDING CHANNEL

(71) Applicant: LSI Corporation, Milpitas, CA (US)

(72) Inventors: Wu Chang, Sunnyvale, CA (US); Razmik Karabed, San Jose, CA (US); Shaohua Yang, San Jose, CA (US); Fan Zhang, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,893

(22) Filed: Oct. 18, 2012

(65) Prior Publication Data

US 2014/0111880 A1   Apr. 24, 2014

(51) Int. Cl.
*G11B 20/10* (2006.01)
*G11B 5/00* (2006.01)
*G06F 11/16* (2006.01)
*G11B 5/02* (2006.01)

(52) U.S. Cl.
CPC . *G11B 5/02* (2013.01); *G06F 11/16* (2013.01)
USPC ............................................ 360/39; 714/6.11

(58) Field of Classification Search
None
See application file for complete search history.

(56) References Cited

U.S. PATENT DOCUMENTS

| 6,185,175 | B1 | 2/2001 | Zook | |
|---|---|---|---|---|
| 6,201,839 | B1* | 3/2001 | Kavcic et al. | 714/796 |
| 6,492,918 | B1 | 12/2002 | Rezzi et al. | |
| 6,931,585 | B1* | 8/2005 | Burd et al. | 714/794 |
| 2003/0026028 | A1* | 2/2003 | Ichihara et al. | 360/65 |
| 2004/0071232 | A1* | 4/2004 | de Souza et al. | 375/341 |
| 2006/0245658 | A1* | 11/2006 | Taniguchi et al. | 382/246 |
| 2006/0256896 | A1* | 11/2006 | Venkataramani et al. | 375/341 |
| 2008/0031114 | A1* | 2/2008 | Hong et al. | 369/60.01 |
| 2008/0123210 | A1* | 5/2008 | Zeng et al. | 360/51 |
| 2008/0317140 | A1 | 12/2008 | Coene et al. | |
| 2010/0058152 | A1* | 3/2010 | Harada | 714/795 |
| 2010/0246359 | A1* | 9/2010 | Ross et al. | 369/59.23 |
| 2013/0111306 | A1 | 5/2013 | Chang et al. | |

OTHER PUBLICATIONS

Aleksandar Kavcic; On The Capacity of Markov Sources Over Noisy Channels; IEEE Global Communications Conf; San Antonio, TX; 2001; pp. 2997-3001.

Aleksandar Kavcic; A Signal-Dependent Autoregressive Channel Model; IEEE Transactions on Magnetics; vol. 35, No. 5; Sep. 1999; pp. 2316-2318.

(Continued)

*Primary Examiner* — Thang Tran
(74) *Attorney, Agent, or Firm* — Advent, LLP (57) ABSTRACT

A system is described for constructing maximum transition run modulation code based upon a multi-level run-length limited finite state machine. A processor is configured to receive information from a hard disk drive via a read channel and recover data from the hard disk drive using maximum transition run modulation code. A memory has computer executable instructions configured for execution by the processor to model a magnetic recording channel as a partial response channel, model a source of information to the magnetic recording channel to provide an optimized Markov source, and construct a maximum transition run modulation code to mimic the optimized Markov source based upon a finite state machine having a limited transition run length and a multi-level periodic structure.

20 Claims, 5 Drawing Sheets

(56) References Cited

OTHER PUBLICATIONS

Mario Blaum, Roy D. Cideciyan, Evangelos Eleftheriou, Rick Galbraith, Ksenija Lakovic, Thomas Mittelholzer, Travis Oenning and Bruce Wilson; High-Rate Modulation Codes for Reverse Concatentation; IEEE Transactions on Magnetics; vol. 43, No. 2; Feb. 2007; pp. 740-743.

Brian Marcus; Sofic Systems and Encoding Data; IEEE Transactions on Information Theory; vol. IT-31, No. 3; May 1985; pp. 366-377.

Pending U.S. Appl. No. 13/654,931, filed Oct. 18, 2012.

* cited by examiner

MULTI-LEVEL RUN-LENGTH LIMITED FINITE STATE MACHINE FOR MAGNETIC RECORDING CHANNEL

BACKGROUND

Various data processing systems have been developed including storage systems, cellular telephone systems, and radio transmission systems. In such systems, data is transferred from a sender to a receiver via a medium. For example, in a storage system, data is sent from a sender (e.g., a write function) to a receiver (e.g., a read function) via a storage medium. As information is stored and transmitted in the form of digital data, errors are introduced that, if not corrected, can corrupt the data and render the information unusable. The effectiveness of any transfer is impacted by any losses in data caused by various factors.

Consequently, error checking systems have been developed to detect and correct errors of digital data. Error checking systems are used, for example, to process data retrieved from a magnetic hard disk drive (HDD). Each data sector of the disk drive has different noise, jitter, and distortion characteristics or signal to noise ratios (SNR), due, for example, to magnetic media defects, off-track writing, high fly height of magnetic write heads during a writing operation, large phase disturbance, and so forth. The throughput of an HDD can be affected by the number of read errors in a data sector, based in part on the SNR, and by the speed at which the read channel can recover from a read error by correcting the errors.

SUMMARY

A system is described for constructing maximum transition run modulation code based upon a multi-level run-length limited finite state machine. A processor is configured to receive information from a hard disk drive via a read channel and recover data from the hard disk drive using maximum transition run modulation code. A memory has computer executable instructions configured for execution by the processor to model a magnetic recording channel as a partial response channel, model a source of information to the magnetic recording channel to provide an optimized Markov source, and construct a maximum transition run modulation code to mimic the optimized Markov source based upon a finite state machine having a limited transition run length and a multi-level periodic structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1A:
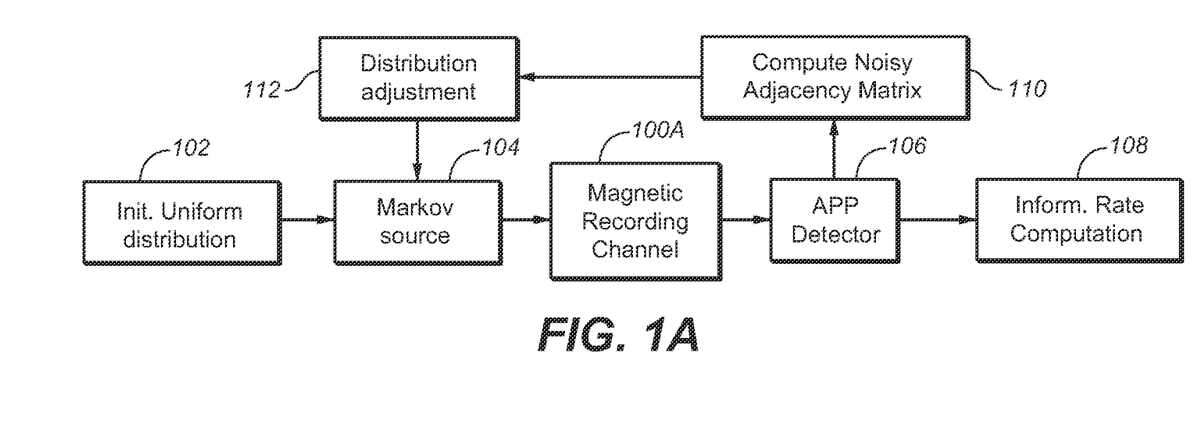
FIG. 1A is a block diagram illustrating a Markov source optimization for a magnetic recording channel in accordance with embodiments of the disclosure.

FIG. 1A illustrates a magnetic recording channel 100A. In embodiments of the disclosure, the magnetic recording channel 100A is used with a finite state machine having a flexible multi-level structure configured to recover data for a read channel, such as, but not limited to, the read channel circuit 510 shown in FIG. 5. Jitter noise is the major noise source in the magnetic recording channel 100A, and is caused by transitions in channel sequence. Transition distribution of a channel sequence generally determines the channel noise level/signature, channel information rate, and, thus, final error rate performance. In high density magnetic recording, burst errors caused by long transition runs are dominant in read channels. To eliminate long transition runs, maximum transition run (MTR) codes are used as modulation codes in the magnetic recording channel 100A. For example, an MTR(j) code, where j refers to the length of a transition run, is used to terminate transition runs longer than j. However, MTR coded channels also incur additional channel density penalty and performance degradation due to the code rate loss. For example, MTR (j=3) code (mtr3 code) does not offer an information rate greater than approximately 0.9468. In order to construct a finite state machine that can generate sequences with better transitions than mtr3 code, a Markov source is optimized to find optimized transition distributions of channel sequence for a particular density of interest, and one or more finite state machines (FSMs) are constructed with multi-level structure to shape the transition distribution close to the optimized transition distribution. In this manner, FSMs are constructed that have a wide range of capacity (code rate), e.g., ranging from approximately 0.94 to 0.96. In some embodiments, these FSMs can offer performance improvement over, for example, an mtr3 coded channel.

In embodiments of the disclosure, channel capacity is used as an indication of the highest code rate of error correction code (ECC) that can provide error free reception at a receiver. However, to achieve better performance given a fixed ECC code rate, it is desirable to have a higher mutual information rate (e.g., approaching channel capacity). By optimizing the source distribution, the channel mutual information rate can be maximized to be very close to the channel capacity. In some embodiments, a magnetic recording channel is modeled as a partial response channel having memory. A source that provides information to the magnetic recording channel is also modeled as having memory, e.g., during an optimization referred to as a Markov source optimization. A Markov source optimization is an iterative procedure, which is considered to converge when the information rate stops increasing, e.g., as illustrated in FIG. 1A, where a magnetic recording channel module 100A is supplied with an initial uniform distribution of data 102 via a Markov source module 104, the data is then supplied from the magnetic recording channel module 100A to an a posteriori probability (APP) detector module 106 and subsequently to an information rate computation module 108, and where a loop is provided from the APP detector module 106 back to the Markov source module 104 via a noisy adjacency matrix computation module 110 (connected to the APP detector module 106) and a distribution adjustment module 112 (connected to the noisy adjacency matrix computation module 110 and the Markov source module 104). In some embodiments, the Markov source module 104 is implemented using pseudo code, and the performance of the pseudo code is verified by simulation.

Figure 1B:
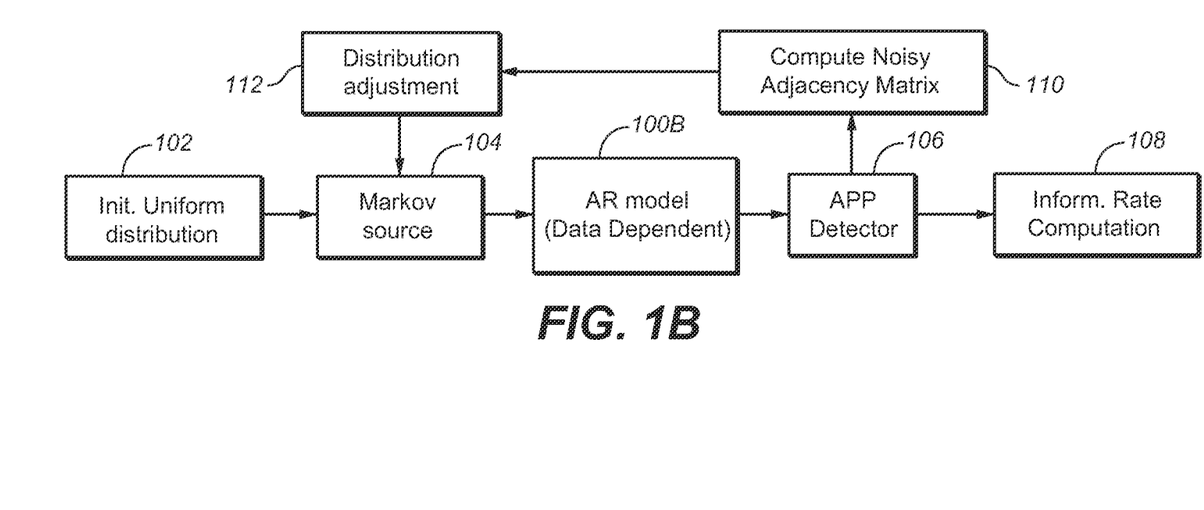
FIG. 1B is a block diagram illustrating a Markov source optimization, where data dependent autoregressive (AR) modeling is used to model a magnetic recording channel in accordance with embodiments of the disclosure.

The magnetic recording channel 100A can be subject to complicated noise factors (e.g., both linear and nonlinear), which are not necessarily captured by the APP detector module 106 in the optimization loop illustrated in FIG. 1A. Thus, in some embodiments, the mutual information rate is not accurately estimated during optimization, and/or a particular iteration is not stable (e.g., resulting in an ill-conditioned distribution). In order to provide a Markov source module 104 that is optimized accurately and/or stably, the APP detector module 106 is matched to the channel exactly, or at least substantially exactly, where data dependent noise is completely, or at least substantially completely, whitened. In embodiments of the disclosure, e.g., as illustrated in FIG. 1B, data dependent autoregressive (AR) modeling is used to model the magnetic recording channel 100A (e.g., using a data dependent AR modeling module 100B). However, this modeling technique is provided by way of example only and is not meant to be restrictive of the present disclosure. Thus, in other embodiments, other various modeling techniques are used. With the data dependent AR modeling embodiment illustrated in FIG. 1B, the data dependent noise whitening filters in the APP detector module 106 are exactly the inverse of the AR model illustrated by AR modeling module 100B.

Figure 2A:
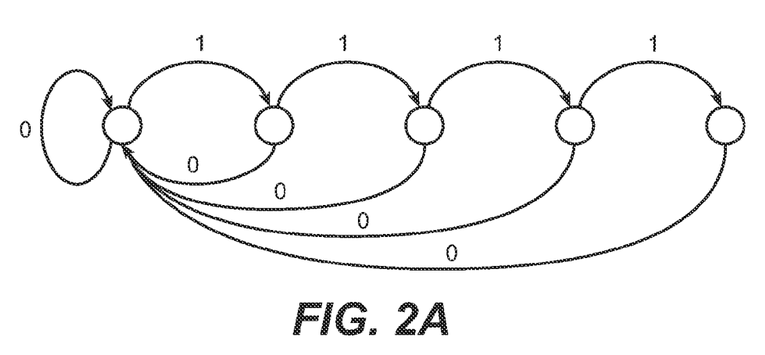
FIG. 2A is a diagrammatic illustration of a finite state machine (FSM) for maximum transition run (MTR) code where j=4 (mtr4 code) in accordance with embodiments of the disclosure.

A code is designed to mimic an optimized Markov source, where the optimized Markov source is determined as described above with reference to FIGS. 1A and 1B. However, providing such a code may be difficult when 0.0x decibel (dB) gain over MTR codes is desired, and where perfect matching on the distribution is preferred. Further high rate codes are generally desirable (e.g., according to the capacity of the Markov source). However, if the source distribution is not matched directly, codes can be designed to match the transition run length distributions of the optimized Markov sources. For example, in embodiments of the disclosure a modulation code is constructed based upon a finite state machine (FSM), which is used to define all properties of a sequence, and can achieve a desired error rate performance. It should be noted that a code configuration based upon an FSM can use an enumerative technique, state splitting, and so on. In some embodiments, an FSM is used with limited transition run length (although the optimized Markov source does not have a limited transition run length). Accordingly, code based upon the FSM in such embodiments is MTR code. In some embodiments, the code rate can range from approximately 0.9468 to 0.9614. For example, since mtr3 code has a capacity of approximately 0.9468 and there may not be space to suppress the distribution, mtr4, mtr5, and code having longer limits can also be considered. FIG. 2A illustrates a basic representation of an FSM for mtr4 code.

Figure 2B:
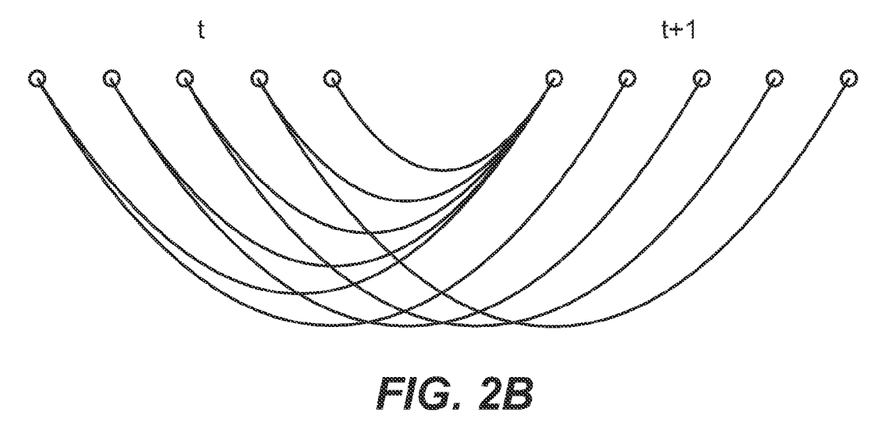
FIG. 2B is a diagrammatic illustration of a single level mtr4 FSM with two time ticks in accordance with embodiments of the disclosure.
Figure 3:
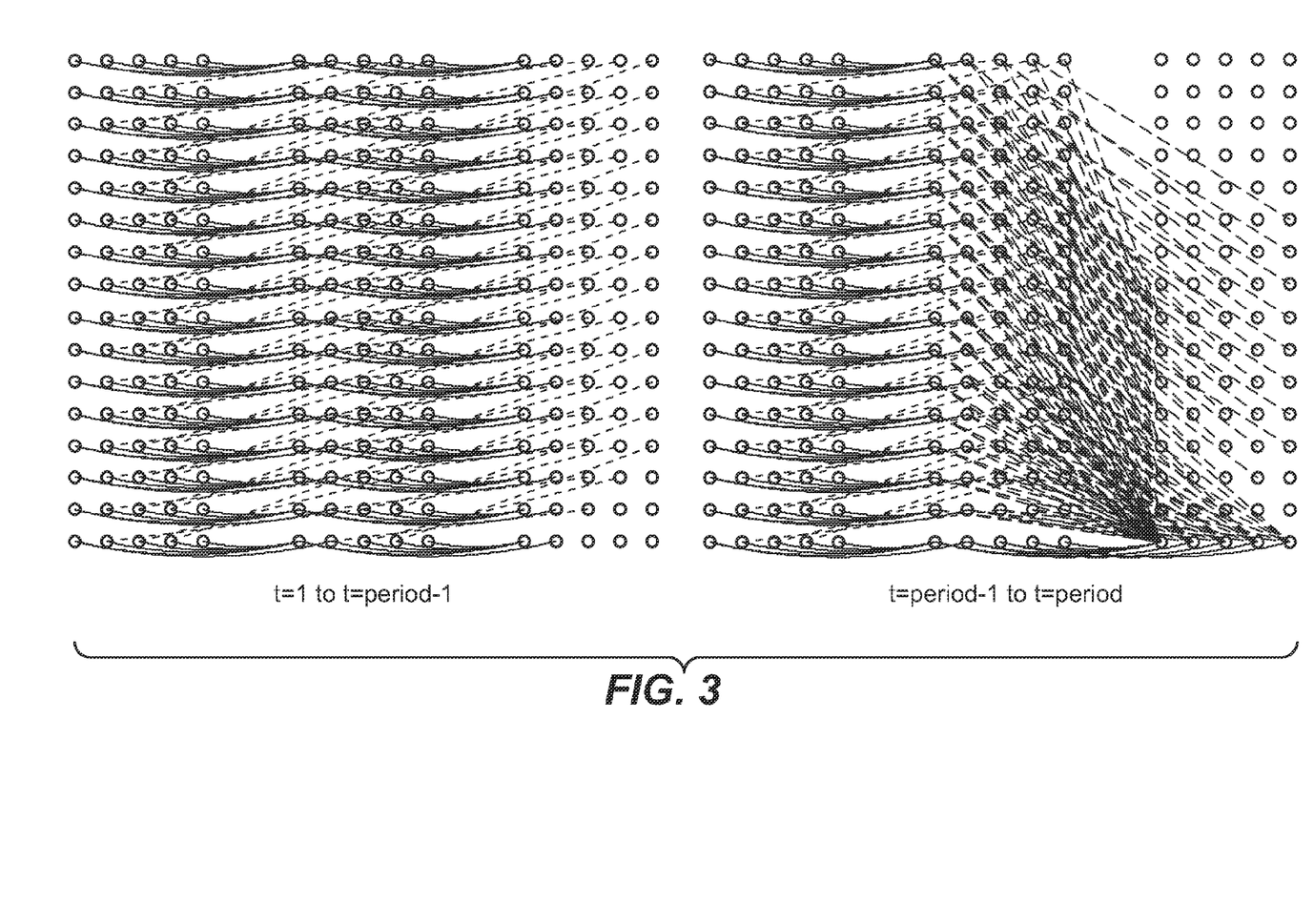
FIG. 3 is a diagrammatic illustration of an FSM with a multi-level (ML) periodic structure, where a timeline is included in accordance with embodiments of the disclosure.

Referring now to FIG. 2B, a multi-level (ML) periodic structure is used to form an FSM. This technique is used to suppress the long transitions inherent in, for example, a simple mtr4 FSM (e.g., the FSM as illustrated in FIG. 2A). For the purposes of the present disclosure, the term "periodic" is used to refer to an FSM that has an output granularity greater than one (1) binary digit (bit), such as the granularity of a block (e.g., where the block length is the period). Referring to FIG. 3, an example FSM is illustrated with an accompanying timeline. To suppress the transitions, an ML structure is used. Given a fixed number of levels, where the sequence starts from the lowest level, the sequence flows upward when transitions occur that are to be suppressed. In this manner, "penalties" are added on the transition patterns in the FSM. It should be noted that states in the top level have no upwardly extending branches. In operation, as the last time increment (e.g., tick) of the period is encountered, the constraint is loosened by lowering the group of connections by several levels, referred to as a "drop." In the accompanying FIG. 3, the level of the FSM is equal to sixteen (16), the penalty is equal to [0, 1, 2, 3] upward levels for a single transition, and the drop is equal to nine (9). In this figure, the last transition is illustrated in double, triple, and four transition runs.

In embodiments of the disclosure, the multi-level finite state machine can have one or more of the following characteristics. In some embodiments, the capacity of the FSM is greater than the code rate needed for a particular configuration. In some embodiments, the transition distribution of the FSM approaches the optimized transition distribution. For example, the transition distribution of the finite state machine can be at least substantially equal to the transition distribution of the optimized Markov source. In some embodiments, penalties are time-invariant. In embodiments of the disclosure, an exhaustive search is used to produce a multi-level finite state machine structure. For example, the following search algorithm is used to generate a multi-level finite state machine. As described herein, a search algorithm is provided using pseudo code, where [p1, p2, p3, p4] represents penalties for the first, second, third, and fourth transitions, respectively; P_limit is a predefined limit for the penalties; and L_limit is the limit set for a particular level. Then, for a particular period,

```
N_P = [p1, p2, p3, p4] * [1, P_limit, P_limit^2, P_limit^3]^T;
for (level = 2; level <= L_limit; level++) {
    for (drop = level - 1; drop > 0; drop--) {
        for (p = 1; p <= N_P; p++) {
            convert p to [p1, p2, p3, p4] then construct the FSM
            compute the capacity of the FSM, C_{fsm}, and the
            probabilities for dc, 1, 2, 3 and 4 transition runs, i.e., the
            distribution
            if C_{fsm} > k/n and the distribution is close to the optimized
            one, then this setting [level, drop, p1, p2, p3, p4] is
            saved to a list for later processing
        }
    }
}
```

After executing the preceding algorithm, a list of possible FSMs is available. One or more FSMs are selected according to, for example, FSMs that provide sufficient large capacity, transitions that are close to an optimized transition, and so forth. For the purposes of the present disclosure, the term "close" is used to refer to transitions with probabilities in a predefined small range. In embodiments of the disclosure, an FSM is selected based upon one or more criteria, including which FSM characteristics provide the best suppression for long transitions (e.g., fewer 3t and 4t transitions, and so forth). However, total number of transitions can also be used to select an FSM, and may not be easily observed from transition run length distributions. Thus, in some embodiments, a characteristic number of transitions (e.g., a smallest number of transitions) is also used to select an FSM. In some embodiments, e.g., for rates between approximately 0.9468 and 0.9614, code rates with simple integer ratios in the range of 17/18, 19/20, 20/21, 21/22, 22/23, 23/24, and 24/25 are used. In such embodiments, an FSM with mtr5 or longer run length is obtained.

Figure 4:
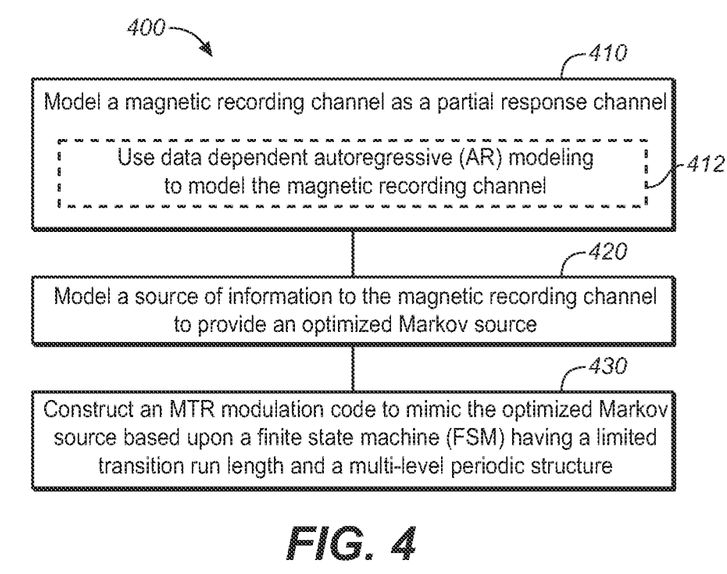
FIG. 4 is a flow diagram illustrating a method for constructing MTR modulation code, e.g., for recovering data from a hard disk drive (HDD) in accordance with embodiments of the disclosure.
Figure 5:
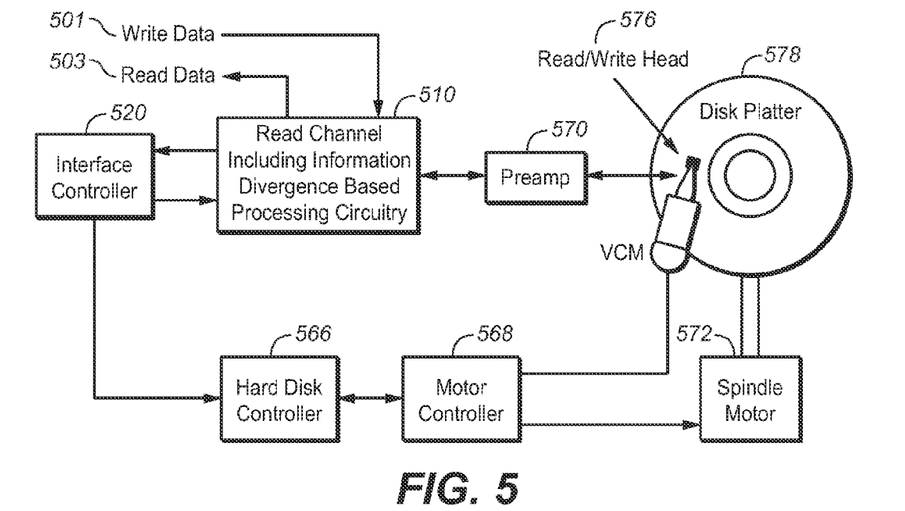
FIG. 5 is a block diagram illustrating a storage system having information divergence based data processing circuitry in accordance with embodiments of the disclosure.

FIG. 4 illustrates a method 400 in an example embodiment that is employed by a read channel, such as the read channel circuit 510 of FIG. 5, to construct MTR modulation code. As shown, a magnetic recording channel is modeled as a partial response channel (Block 410). In some embodiments, the magnetic recording channel is modeled using AR modeling (Block 412). Then, a source of information to the magnetic recording channel is modeled to provide an optimized Markov source (Block 420). Next, MTR modulation code is constructed to mimic the optimized Markov source based upon an FSM having a limited transition run length and a multi-level periodic structure (Block 430).

Figure 6:
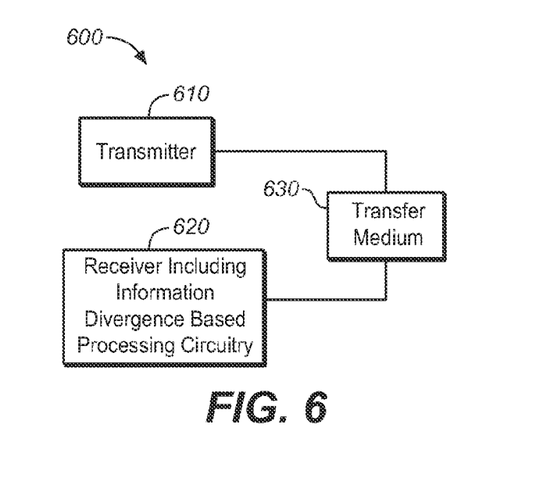
FIG. 6 is a block diagram illustrating a data transmission system having information divergence based data processing circuitry in accordance with embodiments of the disclosure.

Although the disclosure is not limited to any particular application, several examples of applications are presented in FIGS. 5 and 6. In FIG. 5 a storage system 500 is illustrated. The storage system 500 includes a read channel circuit 510 that employs information divergence based data processing circuitry in accordance with embodiments of the disclosure. In some embodiments, the storage system 500 is, for example, a hard disk drive (HDD). As shown, the storage system 500 includes a preamplifier 570, an interface controller 520, a hard disk controller 566, a motor controller 568, a spindle motor 572, a disk platter 578, and a read/write head assembly 576. The interface controller 520 controls addressing and timing of data to the disk platter 578 during a write operation and from the disk platter 578 during a read operation. Interface controller 120 also interacts with a host controller that includes out of order constraint command circuitry. The data on the disk platter 578 includes groups of magnetic signals that are detected by the read/write head assembly 576 when the assembly is properly positioned over disk platter 578. In embodiments of the disclosure the disk platter 578 includes magnetic signals recorded in accordance with either a longitudinal or a perpendicular recording scheme.

In a typical read operation, the read/write head assembly 576 is accurately positioned by the motor controller 568 adjacent a desired data track on the disk platter 578. In some embodiments, the read/write head assembly 176 is positioned using a voice coil motor actuator VCM. The motor controller 568 positions the read/write head assembly 576 in relation to the disk platter 578 and drives the spindle motor 572 by moving the read/write head assembly 576 to the proper data track on the disk platter 578 under the direction of the hard disk controller 566. The spindle motor 572 spins the disk platter 578 at a determined spin rate (e.g., at a determined number of revolutions per minute (RPM)). Once the read/write head assembly 576 is positioned adjacent to the proper data track, magnetic signals representing data on the disk platter 578 are sensed by the read/write head assembly 576 as the disk platter 578 is rotated by the spindle motor 572. The sensed magnetic signals are provided as a continuous, minute analog signal representative of the magnetic data on the disk platter 578. This minute analog signal is transferred from the read/write head assembly 576 to the read channel circuit 510 via a preamplifier 570. The preamplifier 570 is operable to amplify the minute analog signals accessed from the disk platter 578. In turn, the read channel circuit 510 decodes and digitizes the received analog signal to recreate the information originally written to the disk platter 578. This data is provided as read data 503 to a receiving circuit. A write operation is substantially the opposite of the preceding read operation with write data 501 being provided to the read channel circuit 510. This data is then encoded and written to the disk platter 578.

It should be noted that in some embodiments, the storage system 500 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments of the disclosure data is mirrored to multiple disks in the RAID storage system, or is sliced and distributed across multiple disks using a number of techniques. If a small number of disks in the RAID storage system fail or become unavailable, error correction techniques are used to recreate the missing data based on the remaining portions of the data from the other disks in the RAID storage system. The disks in the RAID storage system can be, but are not necessarily limited to, individual storage systems such as storage system 500, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

In embodiments of the disclosure, a data decoder circuit used in relation to read channel circuit 510 comprises, but is not necessarily limited to, a low density parity check (LDPC) decoder circuit. Low density parity check technology is applicable to transmission of information over various channels and/or information storage systems on various media. Transmission applications include, but are not necessarily limited to: optical fiber, radio frequency channels, wired or wireless local area networks, digital subscriber line technologies, wireless cellular, Ethernet over various mediums such as copper or optical fiber, cable channels such as cable television, and Earth-satellite communications. Storage applications include, but are not necessarily limited to: hard disk drives, compact disks, digital video disks, magnetic tapes and memory devices such as DRAM, NAND flash, NOR flash, other nonvolatile memories and solid state drives.

In addition, it should be noted that in some embodiments, the storage system 500 is configured to include solid state memory to store data in addition to the storage offered by the disk platter 578. In embodiments of the disclosure, solid state memory is used in parallel to the disk platter 578 to provide additional storage. The solid state memory receives and provides information directly to the read channel circuit 510. Additionally, in some embodiments the solid state memory is used as a cache, e.g., to provide faster access time than that offered by the disk platter 578. In some embodiments, the solid state memory is disposed between the interface controller 520 and the read channel circuit 510 and operates as a pass through to the disk platter 578, e.g., when requested data is not available in the solid state memory or when the solid state memory does not have sufficient storage to hold a newly written data set. A variety of storage systems including disk platter 578 and solid state memory are furnished in embodiments of the disclosure.

Turning to FIG. 6, a data transmission system 600 including a receiver 620 having information divergence based data processing circuitry is shown in accordance with embodiments of the disclosure. Data transmission system 600 includes a transmitter 610 that is operable to transmit encoded information via a transfer medium 630. The encoded data is received from transfer medium 630 by a receiver 620. Receiver 620 processes the received input to yield the originally transmitted data.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In embodiments of the disclosure that manifest in the form of integrated circuits, the various blocks discussed in the above disclosure may be implemented as integrated circuits along with other functionality. Such integrated circuits can include all of the functions of a given block, system or circuit, or a portion of the functions of the block, system or circuit. Further, elements of the blocks, systems or circuits may be implemented across multiple integrated circuits. Such integrated circuits can comprise various integrated circuits including, but not limited to: a system on a chip (SoC), a monolithic integrated circuit, a flip chip integrated circuit, a multichip module integrated circuit, and/or a mixed signal integrated circuit. In embodiments of the disclosure that manifest in the form of software, the various blocks discussed in the above disclosure represent executable instructions (e.g., program code) that perform specified tasks when executed on a processor. These executable instructions can be stored in one or more tangible computer readable media. For example, the read channel 510 can employ a processor that receives information from the disk platter 578 and recovers data from the disk platter using MTR modulation code. The read channel 510 can also employ memory having computer executable instructions stored thereon, where the computer executable instructions are configured for execution by the processor to perform one or more of the techniques described herein. In some such embodiments, the entire system, block or circuit may be implemented using its software or firmware equivalent. In some embodiments, one part of a given system, block or circuit may be implemented in software or firmware, while other parts are implemented in hardware.

Although embodiments of the disclosure have been described in language specific to structural features and/or methodological acts, it is to be understood that the subject matter defined in the appended claims is not necessarily limited to the specific embodiments described. Although various configurations are discussed the apparatus, systems, subsystems, components and so forth can be constructed in a variety of ways without departing from teachings of this disclosure. Rather, the specific features and acts are disclosed as embodiments of implementing the claims.

What is claimed is:

1. A system comprising:
a processor configured to receive information from a hard disk drive via a read channel and recover data from the hard disk drive using maximum transition run modulation code; and
a memory having computer executable instructions stored thereon, the computer executable instructions configured for execution by the processor to:
model a magnetic recording channel as a partial response channel,
model a source of information to the magnetic recording channel to provide an optimized Markov source, and
construct the maximum transition run modulation code to mimic the optimized Markov source based upon a finite state machine having a limited transition run length and a multi-level periodic structure.

2. The system as recited in claim 1, wherein the magnetic recording channel is modeled using data dependent autoregressive modeling.

3. The system as recited in claim 1, wherein the multi-level periodic structure of the finite state machine has an output granularity of at least a block.

4. The system as recited in claim 1, wherein a constraint of the finite state machine is loosened during a final time increment of the period.

5. The system as recited in claim 4, wherein the constraint is loosened by lowering a group of connections by at least one level.

6. The system as recited in claim 1, wherein a capacity of the finite state machine is greater than a code rate for the magnetic recording channel.

7. The system as recited in claim 1, wherein a transition distribution of the finite state machine is at least substantially equal to a transition distribution of the optimized Markov source.

8. A non-transitory computer-readable storage medium having computer executable instructions configured to construct maximum transition run modulation code, the computer executable instructions comprising:
modeling, by a processor, a source of information to a partial response channel to provide an optimized Markov source; and
constructing, by the processor, the maximum transition run modulation code to mimic the optimized Markov source based upon a finite state machine having a limited transition run length and a multi-level periodic structure.

9. The non-transitory computer-readable storage medium as recited in claim 8, wherein the partial response channel models a magnetic recording channel using data dependent autoregressive modeling.

10. The non-transitory computer-readable storage medium as recited in claim 8, wherein the multi-level periodic structure of the finite state machine has an output granularity of at least a block.

11. The non-transitory computer-readable storage medium as recited in claim 8, wherein a constraint of the finite state machine is loosened during a final time increment of the period.

12. The non-transitory computer-readable storage medium as recited in claim 11, wherein the constraint is loosened by lowering a group of connections by at least one level.

13. The non-transitory computer-readable storage medium as recited in claim 8, wherein a transition distribution of the finite state machine is at least substantially equal to a transition distribution of the optimized Markov source.

14. A computer-implemented method for recovering data from a hard disk drive, the computer-implemented method comprising:
modeling, by a processor, a magnetic recording channel as a partial response channel;

modeling, by the processor, a source of information to the magnetic recording channel to provide an optimized Markov source; and causing the processor to construct a maximum transition run modulation code to mimic the optimized Markov source based upon a finite state machine having a limited transition run length and a multi-level periodic structure.

15. The computer-implemented method as recited in claim 14, wherein the magnetic recording channel is modeled using data dependent autoregressive modeling.

16. The computer-implemented method as recited in claim 14, wherein the multi-level periodic structure of the finite state machine has an output granularity of at least a block.

17. The computer-implemented method as recited in claim 14, wherein a constraint of the finite state machine is loosened during a final time increment of the period.

18. The computer-implemented method as recited in claim 17, wherein the constraint is loosened by lowering a group of connections by at least one level.

19. The computer-implemented method as recited in claim 14, wherein a capacity of the finite state machine is greater than a code rate for the magnetic recording channel.

20. The computer-implemented method as recited in claim 14, wherein a transition distribution of the finite state machine is at least substantially equal to a transition distribution of the optimized Markov source.

* * * * *